United States Patent [19]

Mattila et al.

[11] Patent Number: 4,883,539

[45] Date of Patent: Nov. 28, 1989

[54] COATED SILICATE PARTICLES

[75] Inventors: Harri O. Mattila, Ulvila; Pekka J. Eskelinen, Pori, both of Finland

[73] Assignee: Kemira Oy, Finland

[21] Appl. No.: 168,279

[22] Filed: Mar. 15, 1988

[30] Foreign Application Priority Data

Apr. 14, 1987 [FI] Finland .................................. 871644

[51] Int. Cl.$^4$ ............................................. C04B 14/20
[52] U.S. Cl. .................................................... 106/417
[58] Field of Search .......................................... 106/417

[56] References Cited

U.S. PATENT DOCUMENTS 3,340,006 9/1967 Mochel ................................. 23/144
4,192,691 3/1980 Armanini ............................ 106/417

FOREIGN PATENT DOCUMENTS 2114557 8/1983 United Kingdom .

Primary Examiner—Theodore Morris
Attorney, Agent, or Firm—Thomas R. Vigil; James P. Hanrath

[57] ABSTRACT

The invention relates to platey silicate particles coated with a metal oxide insoluble in mineral acids, by means of which a nacreous effect is obtained. In the method there is prepared a preliminary-stage product of coated silicate particles, and the particles thus obtained are leached by using a mineral acid, possibly together with some oxidant, whereupon the substrate dissolve selectively so that only the silica skeleton is left.

5 Claims, No Drawings

COATED SILICATE PARTICLES

The invention relates to a method for the preparation of coated platey silicate particles. The invention relates in particular to the coating of phlogopite particles with titanium dioxide, whereby a nacreous effect is produced.

The use of natural nacreous pigments is limited primarily by their high price, quality fluctuation, and unsuitability for certain purposes. For this reason, synthetic nacreous pigments have been developed.

The production of nacreous pigments has been described in general in U.S. Pat. No. 3,087,828. In the method according to DE Pat. No. 2 009 566, titanium dioxide coated nacreous pigments are produced by titration. Of these patents there exist a number of variations by which the properties of the pigments have been improved by using additional coatings (cf. U.S. Pat. Nos. 3,711,308, 4,309,480, and 4,482,389).

U.S. Pat. No. 4,192,691 describes a method for the production of unsupported nacreous pigments, in which muscovite mica coated with a non-toxic metal oxide is leached at an elevated temperature with an aqueous acid solution which contains hydrofluoric acid together with a mineral acid, until the mica substrate has dissolved almost completely without the metal oxide coating dissolving, whereafter the obtained pigments is recovered. Thus a brittle, platey pigment is obtained which has high coverage and luster, but there is the disadvantage that a large amount of fluoride waste difficult to handle is produced.

In commercial products, a classified delaminated mica, usually muscovite, can be used as the substrate. It is also possible to use other micas, such as phlogopite, which is used in connection with the present invention. When phlogopite mica is leached by using mineral acids, cations such as Mg, Al, K and Fe dissolve out from the mica incompletely or completely. If hydrofluoric acid is not used for the leaching, the silica skeleton of the phlogopite remains. The method for leaching phlogopite is described in Finnish Patent 66821.

Now it has been observed surprisingly that nacreous pigments can be produced by first preparing from the substrate and the coating a preliminary-stage product of coated silicate particles; this preliminary-stage product is poorly soluble in acids or, preferably, insoluble in acids, and the particles thus obtained are leached by using a mineral acid, possibly together with some oxidant.

In particular, the invention makes use of phologopite mica on the surface of which titanium dioxide is precipitated. The titanium dioxide layer is so thick that the obtained pigment reflects, for example a silver color. The product thus obtained is calcinated.

If the pigment thus obtained and a pigment produced on a muscovite substrate are compared with each other, a clear difference can be observed. The phlogopite-based pigment is clearly brownish in a film of paint on a white surface, whereas the muscovite-based pigment is not. The brown color is due to the iron present in phlogopite.

By applying the present invention it is possible to produce, by using a phlogopite substrate, a pigment which is not brown against a white background but colorless. This is due to the leaching out with acid the iron present in the phologopite. In the leaching process, some mineral acid is used, such as sulfuric acid, nitric acid or hydrochloric acid, but not hydrofluoric acid, since it dissolves phlogopite completely, whereupon the pigment particle becomes hollow and easily crumbling. When sulfuric acid is used, the silica skeleton of the phlogopite is left undissolved. This makes the pigment particles stronger as compared with unsupported pigment particles, and thus a bright nacreous pigment with a high coverage is obtained.

In order to enhance the solubility of the cations it is possible to use as an oxidant in addition to a mineral acid also nitric acid or some other known oxidant.

Titanium dioxide coated silicate particles are prepared by known methods for the purpose of preparing nacreous pigments of titanium dioxide and mica pigments in silver, gold or interference colors—red, blue, purple and green—with maximal luster. In addition the colors can be enhanced by precipitating other metal oxides on the surface of the nacreous pigments. The substrate used is phlogopite or some other soluble mica, from which the cations Mg, Al, K and Fe are leached out incompletely or completely. In order to improve the solubility of iron, an oxidant, e.g. nitric acid, nitrates or hydrogen peroxide or other known oxidants, is added to the acid solution. Preferably, however, nitric acid is used. Sufficiently mild conditions are important from the viewpoint of the leaching so that the silica skeleton will remain whole to provide support for the titanium dioxide coating.

The acids used are mineral acids which do not dissolve the coating and the silica skeleton but do dissolve the desired quantities of cations; for example in gold color it is preferable that the iron remains undissolved, and in silver and light shades of color the disturbing yellowness caused by iron is leached out completely. The mineral acid used is preferably sulfuric acid. Hydrofluoric acid cannot be used, because it dissolves the phlogopite completely. The quantity of cations dissolved is dependent on the acid concentrations, the temperature, and the leaching time used. The mineral acids are used in a concentration of 0.1–70%, preferably 1–30%. The leaching is carried out at a low temperature, which is below 100° C., preferably 20°–100° C., and the leaching time is 2–30 hours.

The solids are separated for the slurry, the pigment is washed with water and, when necessary, is neutralized at the end of the wash, and then dried. The product flows easily and does not require additional grinding or classification. The result is a nacreous pigment which has a coverage 3–4 times that of the original pigment which was subjected to acid leaching.

One of the advantages of the method is that the end result of the nacreous pigment is less dependent on the variation of the colors of the natural minerals. Furthermore, by using these pigments a higher nacreous luster is achieved with a smaller amount used than by using nacreous pigments obtained by coating light muscovite with titanium dioxide. The pigments can be used in the same manner as nacreous pigments are used in paints, plastics and cosmetics. The covering capacity of the pigments is approximately doubled by the acid leaching, and so the amount used can be reduced considerably. It can be pointed out as a further advantage that the pigments do not settle in paints, plastics and cosmetics into a dense cake, as does the titanium dioxide coated nacreous pigment if an anti-settling agent is not used. The typical composition of calcinated phlogopite is:

| | |
|---|---|
| SiO$_2$ | 41.4% |
| Al$_2$O$_3$ | 10.1% |
| Fe$_2$O$_3$ | 4.9% |
| FeO | 5.7% |
| MgO | 25.3% |
| K$_2$O | 10.8% |
| Na$_2$O | 0.1% |
| CaO | 0.1% |
| TiO$_2$ | 0.4% |
| P$_2$O$_5$ | 0.1% |
| F | 1.1% |

Silica, SiO$_2$, is the only component which does not dissolve in a mineral acid. An exception to this is hydrofluoric acid, in which it does dissolve. Thus it is possible to dissolve 58.6 % of the phlogopite with a mineral acid which is not hydrofluoric acid. After phlogopite has been coated, complete dissolving of the phlogopite is difficult. In general at least 5 % other oxides are left. Thus, if the leaching has been strong, approximately 53% of the substrate is left.

If the coated phlogopite contains 50% coating and only the SiO$_2$ frame is left of the phlogopite after leaching, the concentration of phlogopite in the product obtained is 37%. Coating amounts above 50% are in general not used.

The invention is illustrated below with the aid of examples.

EXAMPLE 1

46 g of TiO$_2$ coated mica was slurried in 460 ml of ion-exchanged water. The TiO$_2$ coated mica contained TiO$_2$ 16.8% and phlogopite 83.2%. The concentration of iron in the TiO$_2$ coated mica was 4.9% and the concentration of SiO$_2$ was 37.5%. 45ml of a 95% sulfuric acid and 23 ml of a 30 % nitric acid were added to the slurry. The concentration of H$_2$SO$_4$ in the slurry was 14% and the concentration of HNO$_3$ was 3.9%.

The temperature of the slurry was raised to 90° C. in 50 min. When the slurry had reached 90° C., it was left to mix for 20 hours. After leaching, the pigment was recovered by filtration and was then washed and dried.

The pigment contained TiO$_2$ 26.9%, Fe 0.7%, and SiO$_2$ 62.6%.

EXAMPLE 2

50 g of TiO$_2$ coated mica was slurried in 250 g of water. The TiO$_2$ coated mica contained TiO$_2$ 16.8% and phlogopite 83.2%. The TiO$_2$ coated mica contained iron 4.9% and silica 37.5%. 79.1 g of a 95.6% sulfuric acid was added to the slurry. The concentration of sulfuric acid was thus 23.2%.

The temperature of the slurry was raised to 90° C. When the slurry had reached 90° C., it was allowed to remain at that temperature for 20 h 30 min.

The pigment was recovered by filtration. After it was washed and dried it contained TiO$_2$ 26.1%, Fe 1.0% and SiO$_2$ 59.8%.

By the leaching process, a brown-toned pigment is converted to a nearly white or silver pigment. The color change obtained can be measured by means of a colorimeter, the method of which is described in Kirk-Othmer, Encyclopedia of Chemical Technology, 3rd ed., vol. 6, John Wiley & Sons, 1979. The colors of the pigments obtained from the leaching processes described in Examples 1 and 2 and of the titanium dioxide coated phlogopite were measured. The measuring was performed on a latex film.

On the basis of visual observation and the measuring it was noted that the brown-toned pigment became clearly whiter and more reflective. The results are shown in Table 1, in which L* is the whiteness variable, and a* and b* are chromaticity coordinates, and the color deviation E is calculated using the formula:

$$\Delta E = [(\Delta L^*)^2 + (\Delta a^*)^2 + (\Delta b^*)^2]^{\frac{1}{2}}$$

TABLE 1

| Titanium dioxide | L* | a* | b* | ΔE |
|---|---|---|---|---|
| coated phlogopite | 90.3 | 2.5 | 11.8 | 13.6 |
| Pigment of Example 1 | 98.7 | 0.1 | 3.1 | 5.6 |
| Pigment of Example 2 | 99.2 | 0.1 | 3.8 | 6.4 |

We claim:

1. A method for the preparation of coated platey silicate particles, characterized in that there is first prepared a preliminary-stage product of coated silicate particles, made up of a substrate and a coating, the coating on them being either poorly soluble in acids or insoluble in acids, and the particles thus obtained are leached either with a mineral acid, or a mineral acid together with some oxidant and without hydrofluoric acid, whereupon the substrate dissolves selectively so that only the silica skeleton is left.

2. A method according to claim 1, characterized in that the substrate is partly soluble in mineral acid, preferably phlogopite, and the coating material is a metal oxide insoluble in mineral acids, preferably titanium dioxide.

3. A method according to claim 1 or 2, characterized in that the mineral acid used is preferably sulfuric acid and the oxidant used is nitric acid, nitrates or hydrogen peroxide, preferably nitric acid.

4. A method according to any of the above claims, characterized in that the concentration of the mineral acids is 0.1–70%, preferably 2–50%.

5. A method according to any of the above claims, characterized in that the leaching is carried out at a temperature below 100° C., preferably at a temperature of 50°–100° C.

* * * * *